(12) United States Patent
Mandic et al.

(10) Patent No.: US 9,606,702 B2
(45) Date of Patent: *Mar. 28, 2017

(54) MENUS WITH TRANSLUCENCY AND LIVE PREVIEW

(71) Applicant: Microsoft Technology Licensing, LLC, Redmond, WA (US)

(72) Inventors: Mirko Mandic, Seattle, WA (US); Andrew V. Fomichev, Sammamish, WA (US); Jesse Clay Satterfield, Seattle, WA (US); Jensen Harris, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/164,123

(22) Filed: Jan. 24, 2014

(65) Prior Publication Data

US 2014/0143699 A1    May 22, 2014

Related U.S. Application Data (63) Continuation of application No. 12/147,156, filed on Jun. 26, 2008, now Pat. No. 8,645,863, which is a
(Continued)

(51) Int. Cl.
*G06F 3/0482* (2013.01)
*G06F 3/0481* (2013.01)

(52) U.S. Cl.
CPC .......... *G06F 3/0482* (2013.01); *G06F 3/0481* (2013.01); *G06F 2203/04804* (2013.01)

(58) Field of Classification Search
CPC ............... G06F 3/04882; G06F 3/0482; G06F 2203/04804
See application file for complete search history.

(56) References Cited

U.S. PATENT DOCUMENTS

| 4,896,291 A | 1/1990 | Gest et al. |
| 5,283,560 A | 2/1994 | Bartlett |

(Continued)

FOREIGN PATENT DOCUMENTS

| JP | 03-085616 | 4/1991 |
| JP | 08-123647 | 5/1996 |

(Continued)

OTHER PUBLICATIONS

U.S. Appl. No. 11/823,997, Notice of Allowance mailed Jun. 20, 2014, 5 pgs.

(Continued)

*Primary Examiner* — Kieu Vu
*Assistant Examiner* — Blaine Basom
(74) *Attorney, Agent, or Firm* — Michael David Ream; Tom Wong; Micky Minhas (57) ABSTRACT

A region menu is used to easily access menu items. Generally, the region menu includes a number of regions with associated menus that are located close to an initial mouse position from where the region menu is evoked. Hovering over any of the regions of the region menu displays the menu item that is associated with the region. Additionally, hovering over a menu item within one of the regions of the displayed region menu may activate a live preview showing a projected result of what would occur should that menu item be selected. During a live preview, a portion of the region menu becomes translucent such that content beneath the menu becomes visible.

20 Claims, 8 Drawing Sheets

Related U.S. Application Data continuation-in-part of application No. 11/823,997, filed on Jun. 29, 2007, now Pat. No. 8,869,065.

(56) References Cited

U.S. PATENT DOCUMENTS

| | | | |
|---|---|---|---|
| 5,588,107 A | 12/1996 | Bowden et al. | |
| 5,664,133 A | 9/1997 | Malamud et al. | |
| 5,721,853 A * | 2/1998 | Smith | G06F 3/0482 |
| | | | 715/790 |
| 5,790,820 A | 8/1998 | Vayda et al. | |
| 5,828,360 A | 10/1998 | Anderson et al. | |
| 5,828,376 A | 10/1998 | Solimene et al. | |
| 5,854,629 A | 12/1998 | Redpath | |
| 6,414,700 B1 | 7/2002 | Kurtenbach | |
| 6,448,987 B1 | 9/2002 | Easty et al. | |
| 6,466,235 B1 | 10/2002 | Smith et al. | |
| 6,493,006 B1 | 12/2002 | Gourdol et al. | |
| 6,583,798 B1 | 6/2003 | Hoek et al. | |
| 6,614,455 B1 | 9/2003 | Cuijpers et al. | |
| 6,618,063 B1 | 9/2003 | Kurtenbach | |
| 6,704,031 B1 | 3/2004 | Kimball et al. | |
| 7,058,902 B2 | 6/2006 | Iwema et al. | |
| 7,096,431 B2 | 8/2006 | Tambata et al. | |
| 7,210,107 B2 | 4/2007 | Wecker et al. | |
| 7,246,329 B1 * | 7/2007 | Miura | G06F 3/0482 |
| | | | 715/764 |
| 8,607,149 B2 * | 12/2013 | Hintermeister | G06F 3/048 |
| | | | 715/731 |
| 8,645,863 B2 | 2/2014 | Mandic | |
| 2002/0101450 A1 * | 8/2002 | Magendanz | G06F 9/4443 |
| | | | 715/764 |
| 2002/0140740 A1 | 10/2002 | Chen | |
| 2003/0076364 A1 | 4/2003 | Martinez et al. | |
| 2004/0135824 A1 | 7/2004 | Fitzmaurice | |
| 2004/0139401 A1 * | 7/2004 | Unbedacht | G06F 17/212 |
| | | | 715/273 |
| 2006/0013610 A1 | 1/2006 | Martin et al. | |
| 2006/0036945 A1 | 2/2006 | Radtke et al. | |
| 2006/0036964 A1 | 2/2006 | Satterfield | |
| 2006/0095865 A1 | 5/2006 | Rostom | |
| 2007/0157125 A1 | 7/2007 | Peters | |
| 2007/0162898 A1 | 7/2007 | Ramani et al. | |
| 2007/0234223 A1 | 10/2007 | Leavitt | |
| 2007/0250793 A1 | 10/2007 | Miura | |
| 2008/0059913 A1 | 3/2008 | Burtner et al. | |
| 2009/0007015 A1 | 1/2009 | Mandic et al. | |
| 2015/0033171 A1 | 1/2015 | Mandic et al. | |

FOREIGN PATENT DOCUMENTS

| | | |
|---|---|---|
| JP | 08-140003 | 5/1996 |
| JP | H-08-123649 | 5/1996 |
| JP | 10-065985 | 3/1998 |
| JP | 10-307697 | 11/1998 |
| JP | 11-327728 | 11/1999 |
| JP | 2001-273512 | 10/2001 |
| JP | 2001273512 | 10/2001 |
| JP | 2006059359 | 3/2006 |
| JP | 2007-094531 A | 4/2007 |
| JP | 2007-286135 | 11/2007 |
| RU | 2005125839 | 2/2007 |

OTHER PUBLICATIONS

Chinese Decision on Reexamination in Application 200980124787.X, mailed Feb. 17, 2015, 21 pgs.
Malaysian Notice of Allowance in Application PI 2010005577, mailed Feb. 27, 2015, 2 pgs.
Amendment filed Aug. 25, 2010, in U.S. Appl. No. 11/823,997, 10 pgs.
Amendment filed Aug. 7, 2012, in U.S. Appl. No. 11/823,997, 9 pgs.
Amendment filed Jun. 3, 2011, in U.S. Appl. No. 12/147,156, 9 pgs.
Amendment filed Jun. 4, 2013, in U.S. Appl. No. 12/147,156, 9 pgs.
Amendment filed Mar. 13, 2012, in U.S. Appl. No. 12/147,156, 8 pgs.
Amendment filed Mar. 24, 2011, in U.S. Appl. No. 11/823,997, 9 pgs.
Amendment filed Mar. 28, 2013, in U.S. Appl. No. 11/823,997, 10 pgs.
Amendment filed Nov. 30, 2011, in U.S. Appl. No. 11/823,997, 8 pgs.
Amendment filed Oct. 11, 2012, in U.S. Appl. No. 12/147,156, 9 pgs.
Amendment filed Oct. 29, 2010, in U.S. Appl. No. 12/147,156, 8 pgs.
Australian Office Action mailed in Application 2009262813, mailed Feb. 18, 2014, 3 pgs.
Australian Notice of Allowance mailed in Application 2009262813, mailed Apr. 9, 2014, 2 pgs.
Calvary et al.; "Supporting Context Changes for Plastic User Interfaces: A Process and a Mechanism"; 20 pgs.
Chilean 1st Office Action issued in CL Appl. No. 1558-2010, w/English summary dated Mar. 27, 2012, 8 pgs.
Chilean 2nd Office Action mailed Sep. 4, 2012, issued in CL Appl. No. 1558-2010, w/English summary, 10 pgs.
Chinese 1st Office Action mailed Jul. 4, 2012, issued in CN Appl. No. 200980124787.X, w/English Translation, 12 pgs.
Chinese 2nd Office Action mailed Feb. 16, 2013, issued in CN Appl. No. 200980124787.X, w/English Translation, 11 pgs.
Chinese 3rd Office Action mailed Aug. 8, 2013, issued in CN Appl. No. 200980124787.X, w/English Translation, 12 pgs.
Chinese 4th Office Action mailed Dec. 4, 2013, issued in CN Appl. No. 200980124787.X, w/English Translation, 11 pgs.
Ericson; "Final Review: The Lowdown on Office 2007"; http://www.computerworld.com/action/article.do?command=viewArticleBasic&articleId=9003994&pageNumber=2; 4 Pgs.
European Search Report mailed Apr. 12, 2012, in EP Appl. No. 09770685.7, 6 pgs.
Israeli Office Action in Application 209016, mailed Jan. 26, 2014, 7 pgs.
Japanese Final Decision on Rejection in Application 2011-516391, mailed Mar. 7, 2014, 5 pgs.
Japanese Office Action mailed May 14, 2013, issued in JP Appl. No. 2011-516391, w/English translation, 5 pgs.
Koved et al., "Embedded Menus: Selecting Items in Context"; Apr. 1986; pp. 312-318; vol. 29, No. 4.
Kurtenbach et al.; "Issues in Combining Marking and Direct Manipulation Techniques"; 1991; pp. 1-13; http://www.billbuxton.com/GEdit.html.
Microsoft; "How to Create a Mouse Capture Context Menu"; http://msdn2.microsoft.com/en-us/library/ms537651(VS.85).aspx; 2008; 5 Pgs.
Montclair State University; "What's New in Microsoft Office 2007"; http://oit.montclair.edu/documentationpdf/Office_2007_What_New.pdf; Apr. 17, 2007; pp. 1-6.
Moseley, et al. "Mastering Microsoft Office 97"; 1997; Professional Edition, pp. 33-52.
Office Action mailed Apr. 1, 2010 in U.S. Appl. No. 11/823,997, 20 pgs.
Office Action mailed Dec. 28, 2012, in U.S. Appl. No. 11/823,997, 25 pgs.
Office Action mailed Dec. 4, 2012, in U.S. Appl. No. 12/147,156, 21 pgs.
Office Action mailed Feb. 7, 2012, in U.S. Appl. No. 12/823,997, 18 pgs.
Office Action mailed Feb. 7, 2014, in U.S. Appl. No. 11/823,997, 22 pgs.
Office Action mailed Jan. 3, 2011, in U.S. Appl. No. 12/147,156, 18 pgs.
Office Action mailed Jul. 10, 2013, in U.S. Appl. No. 11/823,997, 31 pgs.
Office Action mailed Jun. 3, 2011, in U.S. Appl. No. 11/823,997, 22 pgs.

(56) References Cited

OTHER PUBLICATIONS

Office Action mailed May 11, 2010, in U.S. Appl. No. 12/147,156, 17 pgs.
Office Action mailed May 22, 2012, in U.S. Appl. No. 12/147,156, 18 pgs.
Office Action mailed Nov. 10, 2010, in U.S. Appl. No. 11/823,997, 19 pgs.
Office Action mailed Sep. 13, 2011, in U.S. Appl. No. 12/147,156, 16 pgs.
PCT International Search Report mailed Nov. 30, 2009, in Appl. No. PCT/US2009/045940, 11 pgs.
Russian Decision on Grant in Application 2010153323, received on Jan. 20, 2014, w/English Translation, 17 pgs.
Russian Office Action mailed May 28, 2013, issued in RU Appl. No. 2010153323, with English summary, 5 pgs.
U.S. Appl. No. 11/823,997, Amendment and Response filed Jan. 8, 2014, 10 pgs.
U.S. Appl. No. 12/147,156, Notice of Allowance mailed Oct. 3, 2013, 10 pgs.
U.S. Appl. No. 11/823,997, Amendment and Response filed May 2, 2014, 9 pgs.
"Non-Final Rejection Received in Korean Application No. 10-2010-7028411", Mailed Date: Nov. 24, 2015, 6 Pages.
"Office Action Issued in Canadian Patent Application No. 2725021", Mailed Date: Oct. 16, 2015, 4 Pages.
Chinese Notice on Reexamination in Application 200980124787.X, mailed Sep. 19, 2014, 14 pgs. pgs.
Japanese Notice of Allowance in Application 2011-516391, mailed Sep. 26, 2014, 3 pgs.
U.S. Appl. No. 11/823,997, Amendment after Allowance filed Jul. 23, 2014, 7 pgs.
U.S. Appl. No. 11/823,997, Response after Amendment mailed Sep. 11, 2014, 2 pgs.
Korean Office Action Issued in Application No. 10-2015-7036762, mailed Apr. 21, 2016, 7 pages.
Korean Office Action Issued in Application No. 10-2010-7028411, mailed Apr. 30, 2015, 12 pages.
Isreal Office Action Issued in Application No. 209016, mailed Jul. 22, 2015, 6 pages.
Canadian Notice of Allowance in Application 2725021, mailed May 3, 2016, 1 page.
U.S. Appl. No. 14/511,923, Office Action mailed Nov. 4, 2016, 48 pages.
Israel Office Action in Application 248061, mailed Sep. 29, 2016, 5 pgs. (with Eng. Translation).
European Office Action in Application 09770685.7, mailed Nov. 15, 2016, 6 pgs.

\* cited by examiner

MENUS WITH TRANSLUCENCY AND LIVE PREVIEW

RELATED APPLICATIONS

This application is a continuation of and claims priority to U.S. patent application Ser. No. 12/147,156, entitled MENUS WITH TRANSLUCENCY AND LIVE PREVIEW, filed Jun. 26, 2008, now issued as U.S. Pat. No. 8,645,863, on Feb. 4, 2014, which is a continuation-in-part of U.S. patent application Ser. No. 11/823,997, entitled SEGMENT RING MENU filed Jun. 29, 2007, now issued U.S. Pat. No. 8,869,035, which is incorporated herein by reference in their entirety.

BACKGROUND

User interfaces typically include menus that allow a user to access the functionality of the application. The more menu items included within a menu, however, make a menu more difficult to navigate, interact with and browse. Menus with expandable submenus (i.e. flyouts) generally include fewer top-level menu items but the menu items in the submenus are harder to navigate as compared to the top level menu items.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A region menu is used to easily access menu items. Generally, the region menu includes a number of closely spaced regions with associated menus that are invoked in response to a cursor entering one of the regions. Hovering over any of the regions of the region menu displays the menu items hosted in that region. Additionally, hovering over a menu item within one of the sections of the displayed region menu may activate a live preview of what would occur before the hovered-over menu item is selected. Additionally, a portion of the region menu may become translucent such that content beneath the menu becomes visible.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
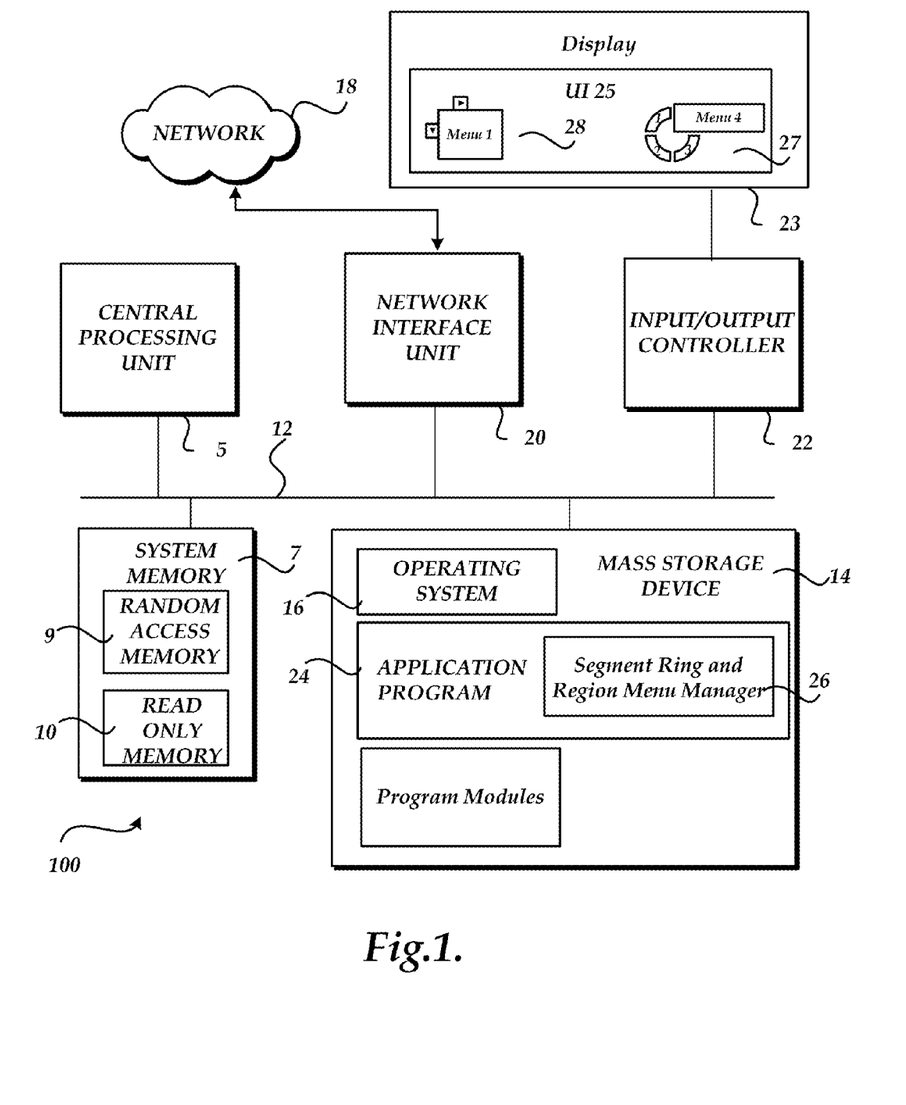
FIG. 1 illustrates an exemplary computing device.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory ("RAM") 9 and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program (s) 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 23, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® operating system from MICROSOFT CORPORATION of Redmond, Wash. The mass storage device 14 and RAM 9 may also store one or more program modules. In particular, the mass storage device 14 and the RAM 9 may store one or more application programs 24. In conjunction with the operation of the application, application program 24 utilizes segment ring and region menu manager 26 to provide segment ring menus 27 and region menus 28 along with a live preview through User Interface ("UI") 25 on display 23. Generally, a segment ring menu is a menu that includes a number of sections each with a corresponding menu that are located equidistant from the initial mouse position from where the segment ring menu is evoked. According to one embodiment, the associated menus are located approximately equidistant from the initial mouse position. Generally, a region menu is a menu that includes a number of regions (i.e. three regions) that are located within regions that are closely spaced from one region to another and also close to the initial mouse position. According to one embodiment, the regions are smaller then the sections that are associated with the segment ring. Alternatively, the regions could be the same size (or larger) as the sections that are associated with the segment ring. As illustrated in FIG. 1, segment ring menu 27 includes a menu (1-4) that is associated with one of the four sections (or quadrants in this instance). Hovering over any of the sections of the segment ring displays the menu items hosted in that section. In the present example, menu 4 that is associated with section four is displayed. The segment ring menu layout and the region menu layout are directed at making it easy for the user to reach any of the menu items with significantly less mouse movement as compared to traditional menu systems. Menu manager 26 is configured to display one of the menus that is associated with a section when invoked. The menu may be invoked many different ways. For example, a user may right click within a document, a user may enter a shortcut key, and the like. While menu manager 26 is shown as part of application 24, menu manager 26 may be separate from application 24. The user can easily access a menu from within segment ring menu 27 or region menu 28 by moving the pointer from one section or region to the next. While a four menu segment menu system is shown in segment ring menu 27, more or less menus may be designed to be equidistant from the center of the segment ring menu. For example, a three menu system, a two menu system, a six menu system and the like may be designed as a segment ring menu for application 24. Similarly, while three regions are shown with region menu 28, more or less menus may be designed within regions. As illustrated in UI 25, when the user hovers over section 4 of the segment menu 27 then menu 4 is provided to the user through UI 25 of display 23. Similarly, when the user hovers over region 1 of region menu 28 (or initially activates region menu 28), menu 1 is provided to the user through UI 25 of display 23. Additional details regarding the menus will be provided below.

Figure 2:
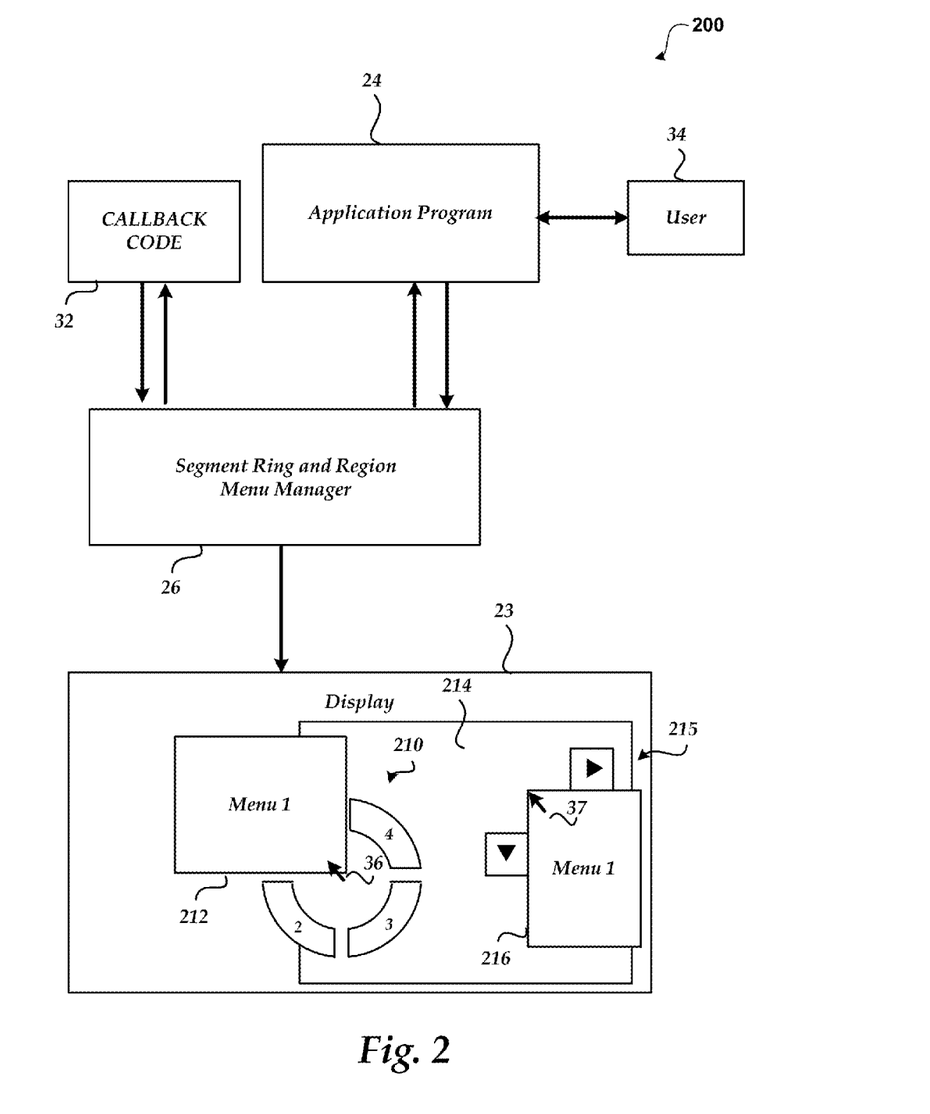
FIG. 2 shows a system for utilizing a segment ring menu and a region menu.

FIG. 2 shows a system 200 for utilizing a segment ring menu and a region menu. As illustrated, system 200 includes user 34, application program 24, callback code 32, segment ring and region menu manager 26, display 23, segment ring menu 210 including menu 212, document 214 and region menu 215 including menu 216.

In order to facilitate communication with the menu manager 26, one or more callback routines, illustrated in FIG. 2 as callback code 32 may be implemented. According to one embodiment, application program 24 is configured to provide menu manager 26 with input directing menu manager 26 to provide user 34 with a display of a menu, such as segment ring menu 210 or a region menu 215. According to one embodiment, segment ring context menu 210 or region menu 215 is shown on the display 23 when the user clicks on the document canvas using the right mouse button (or alternatively, when the user presses the context menu key on the keyboard). In the current example, a user has right-clicked at pointer location 36 within display 23 which invoked segment ring menu 210. Alternatively, a region menu may be invoked. For example, region menu 215 may be invoked when a user has right-clicked at pointer location 37 within display 23. Initially, a menu is displayed that relates to the default section or region for the given context. According to one embodiment, for the segment ring menu a circular transparent graphic is displayed that covers the other sections. For instance, in the present example, section one is considered the default segment and menu 1 212 is displayed. In the region menu, the center region is considered the default region. Any region or section, however, may be considered the default section. According to one embodiment, a segment ring and a region menu is used as a context menu. Generally, a context menu is a shortcut menu that contains menu items for commonly used items. The menu items contained within a context menu may vary depending on the context of the action, the application running, and the item selected. According to one embodiment, a context menu is activated by right clicking a mouse button or using a shortcut key. According to another embodiment, segment ring menus or region menus may be used as top level menus.

In the current example, in the segment ring menu, the context menu items are spread across four ring segments that are located equidistant from the initial mouse position at which location the Segment Ring menu 210 is evoked. Hovering the cursor 36 over any one of the sections of the segment ring context menu displays items hosted in that section. For example, when cursor 36 is hovering over section one, menu 1 (212) is displayed. Dividing the menus in sections (such as quadrants) or regions makes it easier for the user to reach the menu items with significantly less mouse movement as compared to traditional menu systems. According to one embodiment, one section of the context menu is visible on the display 23 at any given time. This helps to minimize the amount of document 214 being obscured by the menu 210. Additionally, distributing the menu contents across the section makes the content within the menu that is associated with each of the sections shorter. This assists in enabling the menu items to be hosted at the top level of a menu, rather than using a flyout menu. As previously stated, the segment ring menu or the region menu may be divided into more or fewer sections (regions) depending on the requirements of the application program. Menu manager 26 determines which section cursor 36 is located and displays the appropriate menu. As such, in a segment ring menu, it takes the same amount of mouse movement from the center of the menu 210 to expose the menu contents associated with any of the four sections, which makes segment ring menu more efficient than traditional menus with expandable submenus (i.e. flyouts). Similarly, in a region menu, while the amount of mouse movement may not be the same to expose another region, the regions are located close together such that activation of any one of the sections requires very little mouse movement. Each region may be adjacent or approximately adjacent to each other. For example, each region may partially overlap each other or each region may be separated slightly (by a few pixels) from the adjacent region. In one embodiment, when region menu contains three regions and when the central region is the default region, the other two regions can be positioned equidistant to the initial mouse interaction position.

Figure 3:
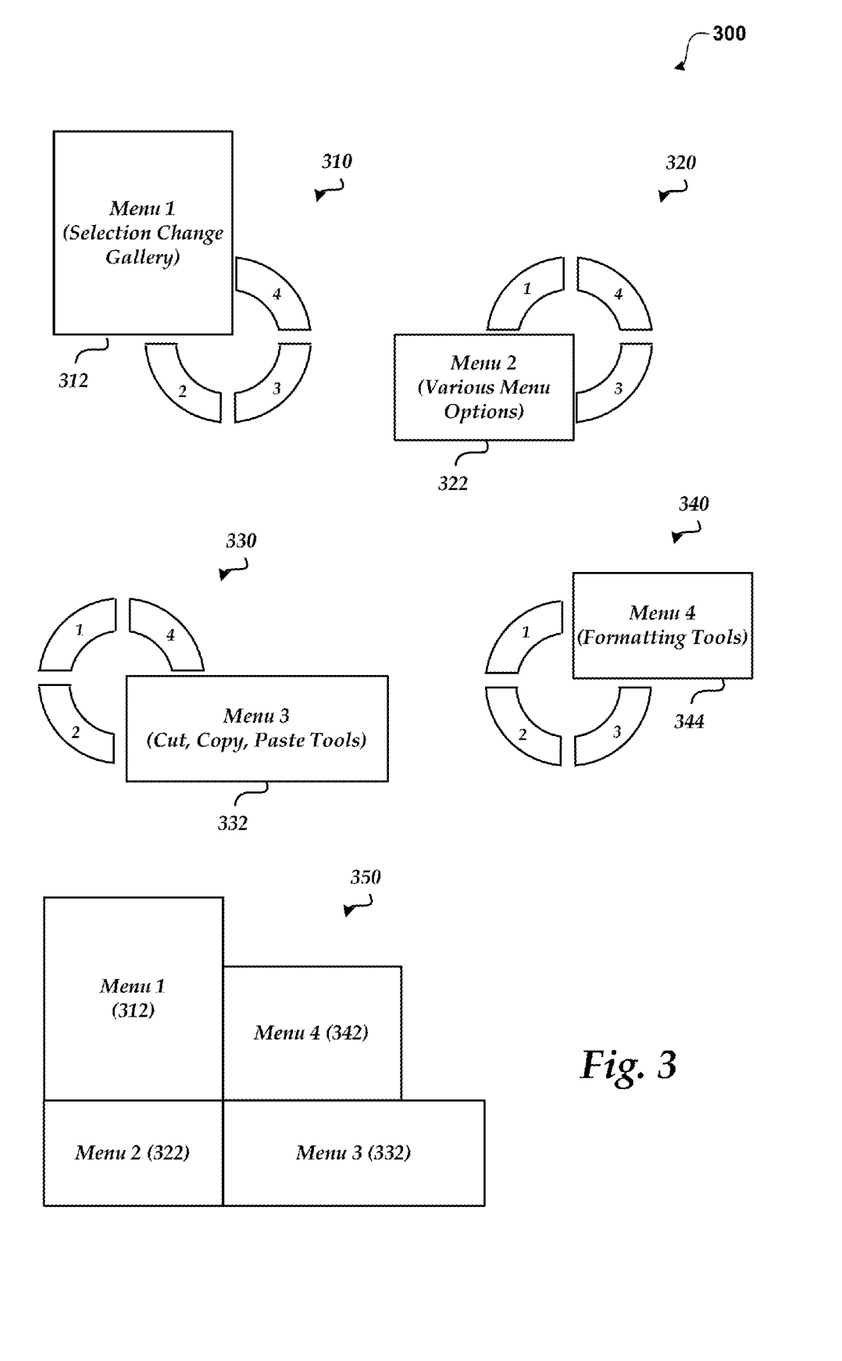
FIG. 3 illustrates exemplary segment ring menus.
Figure 5:
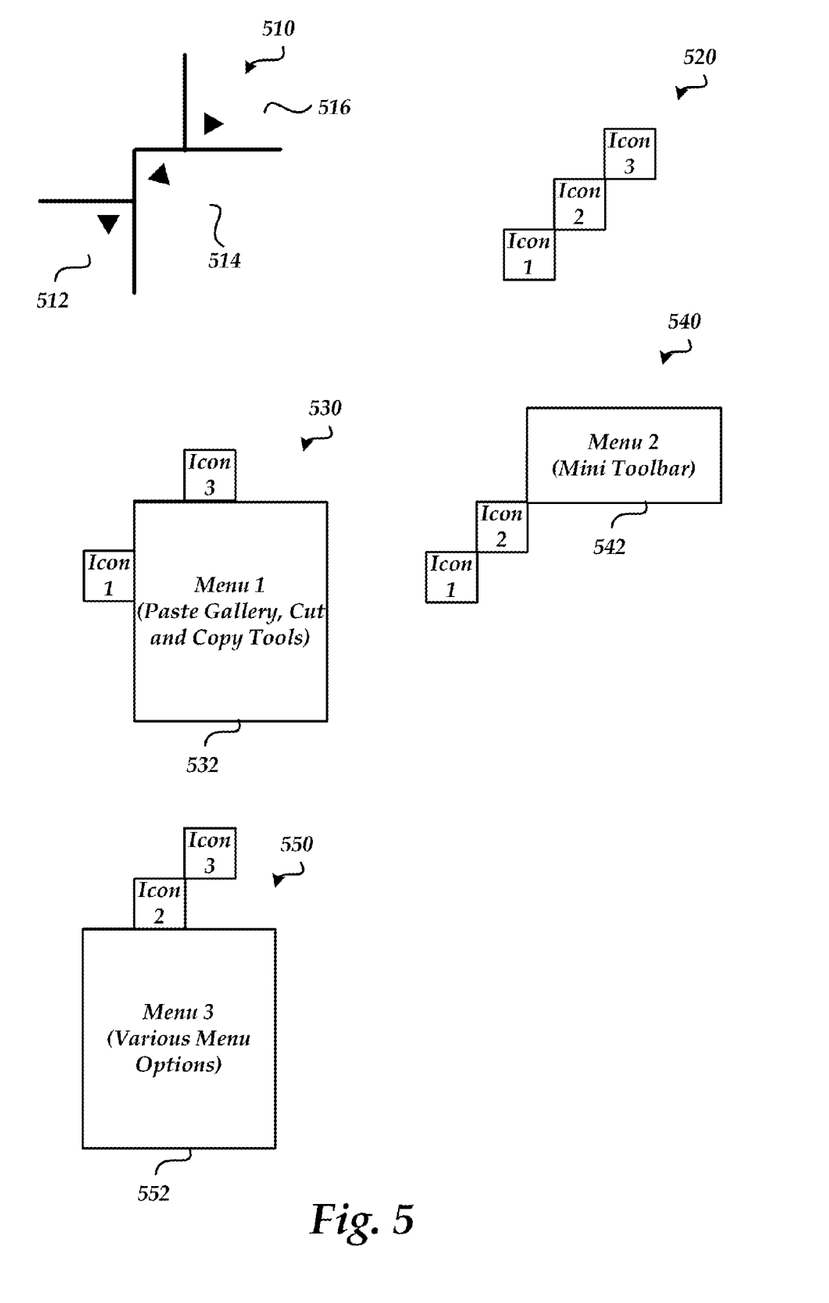
FIG. 5 illustrates exemplary region menus.

FIG. 3 illustrates exemplary segment ring menus. The menu contents are organized into distinct sections, such as quadrants. This is regardless of the application or the object which is selected. For example, four distinct quadrants may be provided including an upper-right section, a lower-right section, lower-left section, and an upper-left section. Illustration 310 shows the menu 312 in section one active. Illustration 320 shows the menu 322 in section two active. Illustration 330 shows the menu 332 in section three active. Illustration 340 shows the menu 344 in section four active. According to one embodiment, only one segment menu is displayed at a time in order to minimize the amount of obscured screen space. However, as illustration 350 shows, the segments are drawn in such a way that each one of them shows up at a distinct screen location. In other words, if all of the menus were shown at the same time, there would be no overlap between them. In another embodiment, as FIG. 5 shows, even though only one region menu is displayed at a time, regions of the region menu can be positioned so that they partially overlap, minimizing the total canvas area that the entire region menu can obscure.

According to one embodiment, the menu items included in the segment ring menus are consistent across applications. According to this embodiment, the upper-right section (section 4) includes direct, unlabeled formatting tools (see illustration 340). The lower-right section (section 3) includes cut, copy and paste tools (see illustration 330). The lower-left section (section 2) includes the menu part (see illustration 320) and the upper-left section (section 1) includes a selection change gallery (see illustration 310). Other divisions (constant or otherwise) of the menu items may be utilized. The segment ring context menu is directed at facilitating more consistent content organization, being more scalable, while affording comparable (and frequently improved) efficiency. According to one embodiment, the sections always host the same type of content, across all of the object types and across all of the applications, enabling the user to develop a sense of spatial constancy with which menu contents can be reached regardless of the context.

The user can dismiss the segment ring menu in the same way in which the traditional context menus are dismissed. For example, the segment ring menu may be dismissed by clicking on an area of the screen surface not covered by any of the currently visible segment ring menu pieces. Similarly, the associated menu may be dismissed when the user clicks on one of the menu options. Alternatively, the menu may stay open when the user clicks on a menu item. As is illustrated, the menus may be dismissed many different ways.

Figure 4:
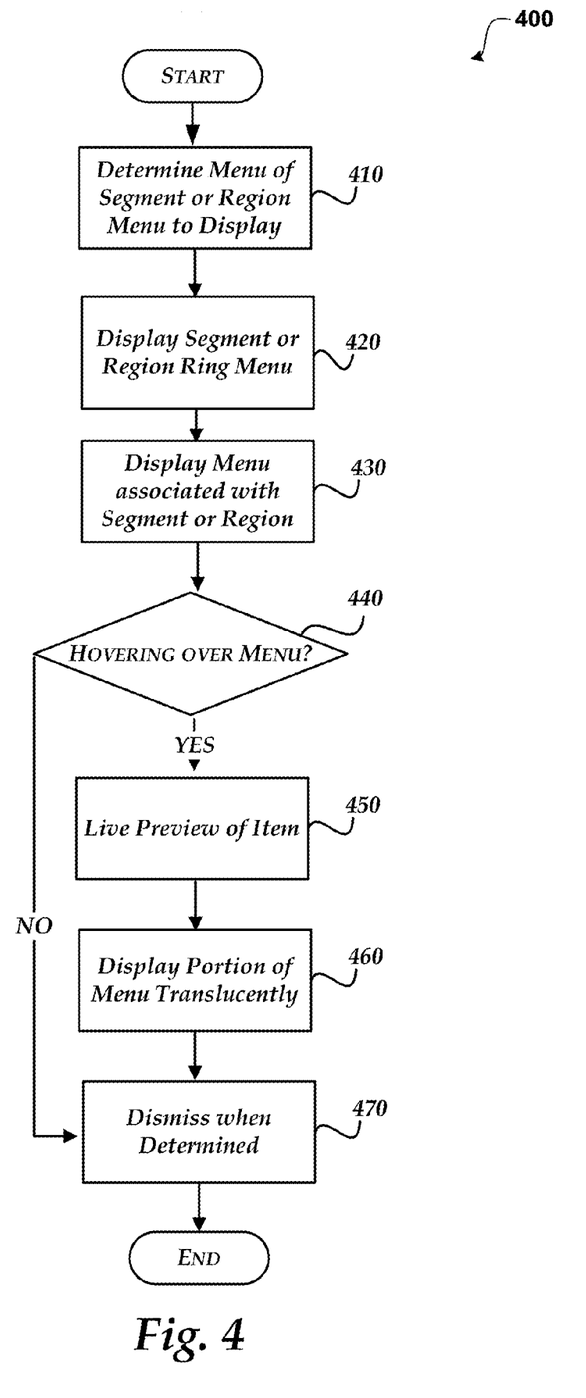
FIG. 4 shows an illustrative process for utilizing a segment ring menu and a region menu with live preview.

Referring now to FIG. 4, an illustrative process 400 for utilizing a segment ring menu and a region menu with live preview will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 410, where the a determination is made as to what section/region of the menu is to be displayed. The menu to display may be determined many different ways. For example, when the segment ring menu or the region menu is first displayed a default menu may be displayed that is associated with one of the sections/regions. For example, the default menu may be determined This determination may be made many different ways, such as from the context and/or a default selection. Alternatively, a keyboard command, or some other input, could be received indicating what menu to display. According to one embodiment, no section menu may be displayed until the cursor moves close to and/or over one of the sections of the segment ring menu or region menu after being displayed.

Moving to operation 420, the segment ring menu or the region menu is displayed. According to one embodiment, for a segment ring menu, the default menu and/or the activated menu is displayed along with a circular graphic of the segment ring menu at a location on the screen where the user activated the menu. According to one embodiment, a determination is made as to whether there is room to display the menu at the location indicated by activating the menu through a right-click or some other method of locating the menu center. In some cases (for example, when the right-click occurs close to the edge of the screen, at a location where the segment ring menu or region menu would not fit on the screen), the menu associations may change and/or the segment ring menu or region menu may be moved such that each of its segments (when/if displayed) may be displayed in its entirety. For example, in order to ensure that the determined menu is displayed on the screen it may be associated with a different segment of the segment ring menu or region menu. In this case, the other menus would also be associated with another ring segment.

Flowing to operation 430, the menu that is associated with the section/region is displayed. According to one embodiment, the menu for the section/region is displayed such that it is displayed when the segment ring menu or the region menu is displayed. As discussed above, according to one embodiment, one menu is displayed at a time. As discussed above, a menu may remain displayed even after a selection depending on the use of the menu that is associated with the section/region.

Moving to decision operation 440, a determination is made as to whether the cursor location is hovering over a menu item within the displayed menu. For example, a user may hover over a menu item relating to a paste operation within a paste gallery (See FIGS. 6-8 for examples). When a user is not hovering over a menu item, the operation may move to operation 470. When a user is hovering over a menu item, the process flows to operation 450.

Flowing to operation 450, a live preview of what would occur if the menu item being hovered-over is selected may be provided. For example, when a user hovers over a paste option, the document contents temporarily change (while the user remains hovering or until the menu option is selected) to show what the projected results of the hovered-over paste option (See FIGS. 7 and 8 for an example of live preview) would be. Providing a live preview assists the user in determining whether or not to apply the menu option currently being hovered over.

At operation 460, a portion of the displayed menu is displayed translucently. In this way, a portion of a document that is displayed under the translucent portion of the menu may be seen without moving the menu. Displaying a portion of the menu translucently allows a portion of the display to be seen by the user which would normally be obscured by the menu thereby allowing the user to see more of the document. For example, during a live preview the translucently of the menu allows the user to see more of the preview (See FIGS. 7 and 8). While examples presented herein show the translucency of the menu with respect to a live preview, the menu may be displayed translucently in other situations. Additionally, while the examples provided herein are related to certain types of functionality (i.e. cut/copy/paste options) any type of functionality may be included within the menu. Generally, a menu may be displayed translucently whenever it would be beneficial for a user to see the display beneath the displayed menu. The translucency may be set to many different settings. For example, the setting could be completely translucent or partially translucent. Additionally, the portion of the menu that is displayed translucently may be configured such that all or only a portion of the menu is displayed translucently. According to one embodiment, the section of the menu containing the menu option being hovered-over is not displayed translucently, while the other sections of the displayed menu are displayed translucently (See FIGS. 7 and 8 for examples of displaying a menu translucently). For instance, sections below and/or above the hovered-over menu item may appear to be transparent.

Transitioning to operation 470, the menu is dismissed when determined For example, the user can dismiss the menu by clicking on an area of the screen surface away from the menu. Similarly, each of the menus associated with a particular section may be dismissed when the user hovers over a different segment of the menu. Also, the menu may be dismissed when the use user executes a control contained in one of the segments.

The process then flows to an end operation and returns to processing other actions.

FIG. 5 illustrates exemplary region menus. The menu contents are organized into distinct regions. This is regardless of the application, or the object which is selected. For example, three distinct regions may be provided including an upper-right region, a middle region, and a lower-left region. Illustration 510 shows three regions of a region menu, including region 512, region 514 and region 516. Moving a pointing device from one region to another region causes the associated menu to be displayed for that region. The regions may be defined many different ways. For example, an indicator (such as an arrow) may show the user where the associated region is located. Illustration 520 shows using graphical icons to provide an indication where the regions are located. According to one embodiment, each region is adjacent to each other such that little cursor movement moves from one region to the next. An area around the graphic (an expander area) may also be used to determine when a cursor (or some other pointing device) is within the region. The expander area has a pre-defined shape and size. The expander area does not have to match the associated expander graphic in terms of shape and size. In particular, the expander area is generally larger than the associated graphic, in order to enable the user to quickly switch to the intended region. As soon as the pointing device enters an expander area, the region menu that is associated with that region becomes visible (and the previously visible region menu is hidden). A default region may also be set for the region menu. According to one embodiment, the center region (region 514 or the region represented by Icon 2) is the region where the default menu is displayed. For example, when the region menu is activated the default menu is also displayed.

Illustration 530 shows the menu 532 in the default section active. According to one embodiment, the default menu includes a paste gallery that includes paste options and cut and copy options. Other options may be configured in the default menu. Illustration 540 shows the menu 542 in the upper-right section active. Illustration 550 shows the menu 552 in the lower-left section active. According to one embodiment, only one region menu is displayed at a time.

According to one embodiment, the menu items included in the region menus are consistent across applications. According to this embodiment, the upper-right section includes a mini toolbar that includes various formatting options. The lower-left section includes the menu part. Other divisions (constant or otherwise) of the menu items may be utilized. The region menu is directed at facilitating more consistent content organization, being more scalable, while affording comparable (and frequently improved) efficiency. According to one embodiment, the sections always host the same type of content, across all of the object types and across all of the applications, enabling the user to develop a sense of spatial constancy with which menu contents can be reached regardless of the context.

The user can dismiss the region menu in the same way in which the traditional context menus are dismissed. For example, the region menu may be dismissed by clicking on an area of the screen surface not covered by any of the currently visible region menu pieces. Similarly, the associated menu may be dismissed when the user clicks on one of the menu options. Alternatively, the menu may stay open when the user clicks on a menu item. As is illustrated, the menus may be dismissed many different ways.

Figure 6:
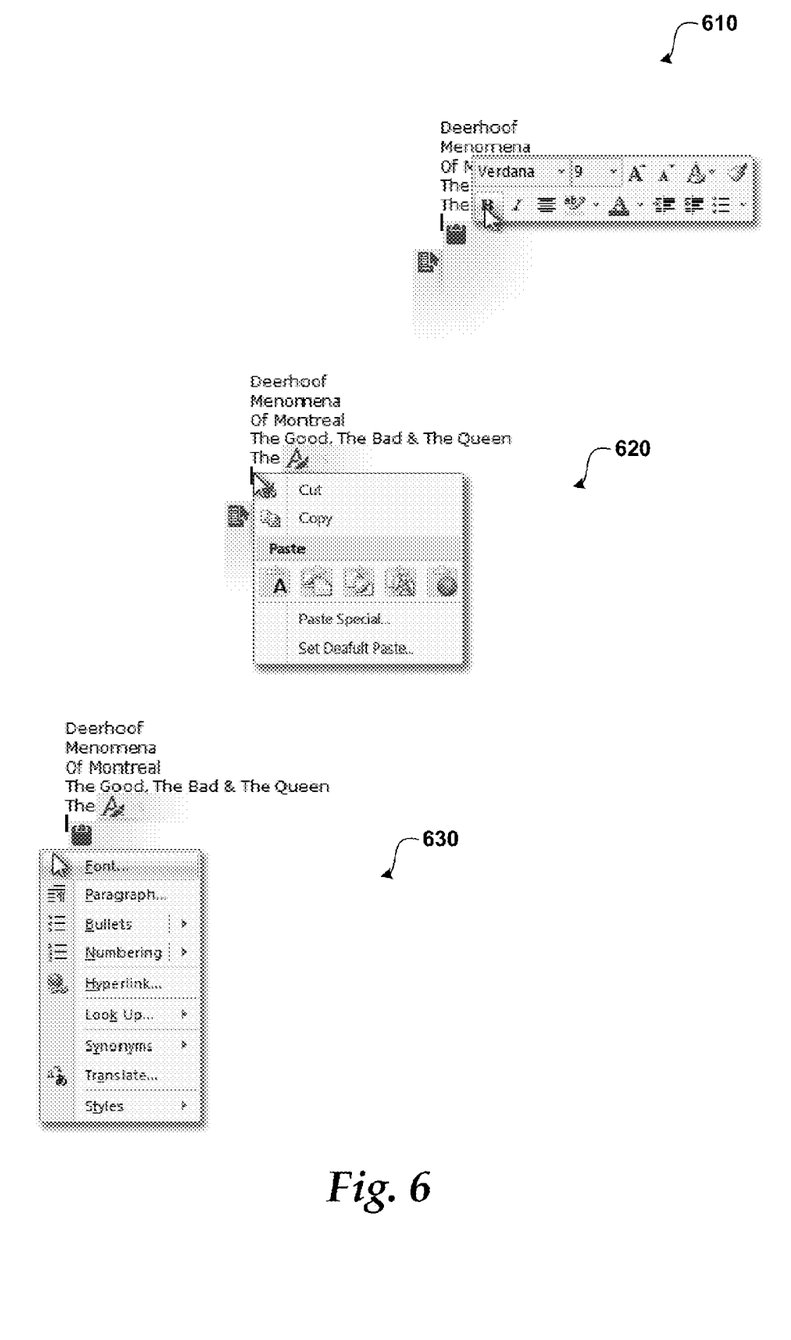
FIG. 6 shows an exemplary region menu with the associated menu for each region displayed.

FIG. 6 shows an exemplary region menu with the associated menu for each region displayed. According to one embodiment, the region menu is displayed on the screen when the user right-clicks on the document (or alternatively, when the user presses the context menu key on the keyboard). Initially, one of the menus (the default region menu for the given context) shows up on the screen, along with a graphic for each of the other, non-exposed regions. The graphics that are displayed hint at the availability of the other region menus. Illustration 620 shows the default region menu displayed. Illustration 610 shows the upper-right region menu displayed and Illustration 630 shows the lower-left menu region displayed. When the cursor moves over another region then its associated menu is activated and displayed. Movement of the cursor enables the user to expose contents of a region by simply hovering over the area associated with that region.

Figure 7:
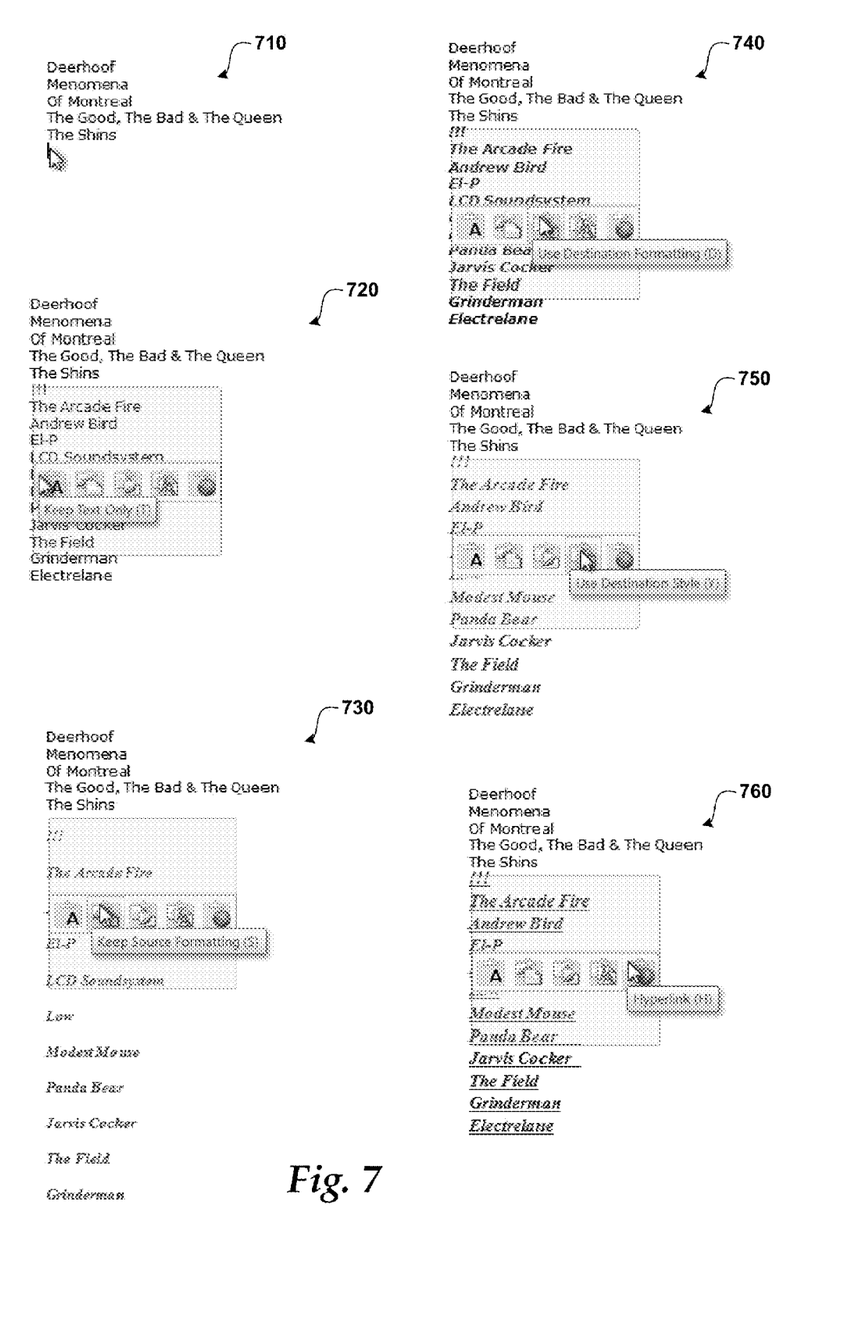
FIG. 7 illustrates using a live preview feature with a region menu.

FIG. 7 illustrates using a live preview feature with a region menu. The illustrations in FIG. 7 show using the different available paste options that are located in the paste gallery of the default region menu. In the example illustrated, assume that a user has selected some content to paste at the cursor location shown in illustration 710. Illustration 710 shows an example list of names of bands with the cursor located directly underneath the "T" of The Shins.

Illustration 720 shows the user activating the region context menu and moving the cursor over the Keep Text Only paste option. When the user hovers over a paste option, a live preview of the paste where it is to occur is provided before the user commits to the operation. As can be seen by referring to the default region menu in FIG. 6 (illustration 620), the cut, copy, paste special and set default paste options are made translucent such that the user is able to see the preview of the paste operation more easily. Were the menu to stay opaque, the user would not be able to see the preview as well. In the example in FIG. 7, when the menu is opaque, the user is only able to see the last line and a portion of the line above the last line if at least some of the default region menu were not made translucent. When a portion of the menu is displayed translucently, the user may see much more of the list. According to one embodiment, a border is displayed around the menu so that the user is provided an indication that other menu items exist within the region menu.

Illustration 730 shows the user hovering over the Keep Source Formatting paste option. In this example, the user is able to see that keeping the source formatting will paste the content differently from only keeping the text only. Upon the user hovering over another paste option, the live preview changes to reflect the currently hovered-over option.

Illustration 740 shows the user hovering over the Use Destination Formatting paste option. In this example, the pasted content appears as the formatting within the document at the insertion point.

Illustration 750 shows the user hovering over the Use Destination Style paste option. As can be seen, the destination style is different from the destination formatting.

Illustration 760 shows the user hovering over the Hyperlink paste option. In this illustration, the pasted content is displayed as hyperlinks.

As can be seen in the above example, the live preview and the displaying of a portion of the region menu translucently allows the user to see projected results of each paste alternative before committing to one of the options.

Figure 8:
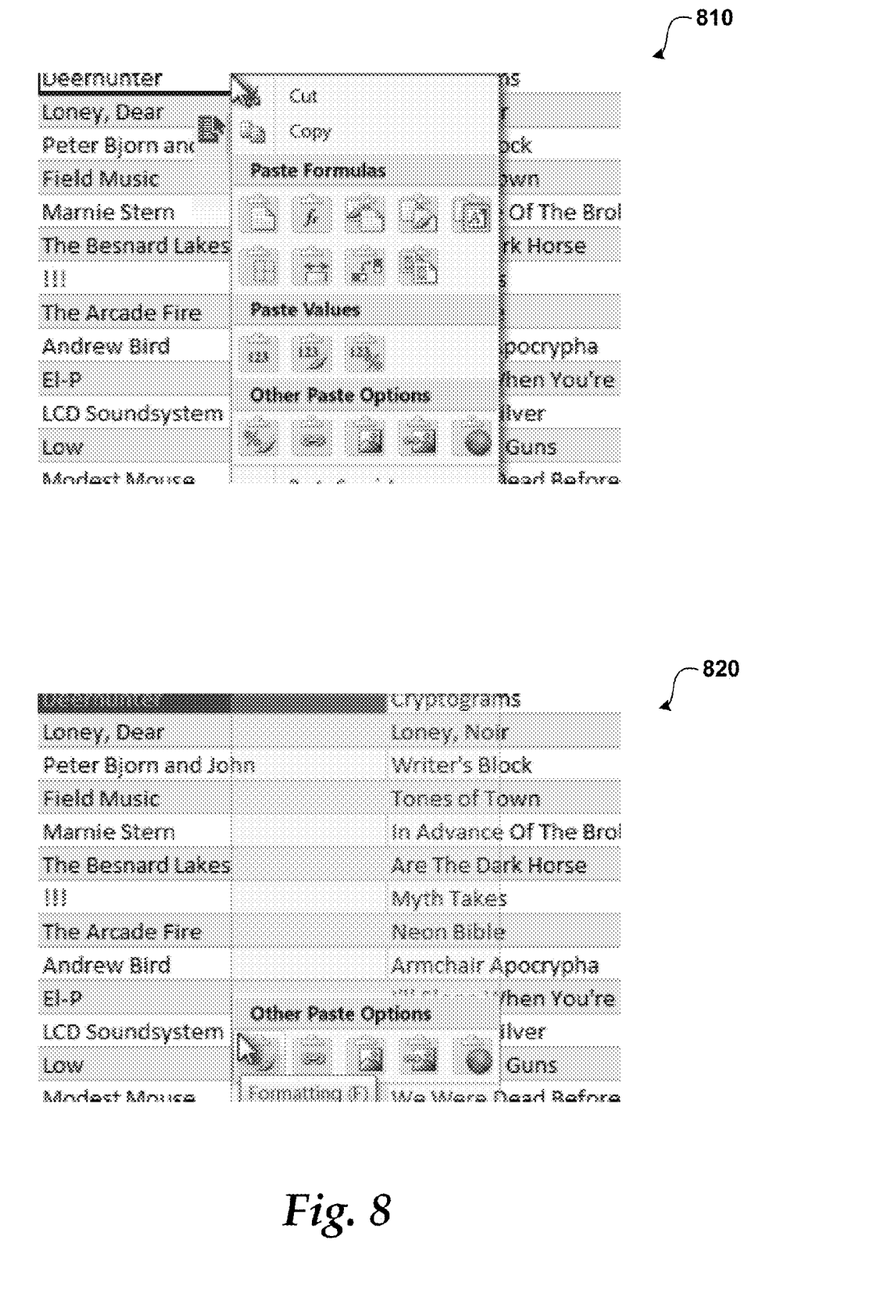
FIG. 8 shows the cursor hovering over a section within a displayed region menu.

FIG. 8 shows the cursor hovering over a section within a displayed region menu. Illustration 810 shows an exemplary default cut/copy/paste menu that includes more options then illustrated in the previous figures. Illustration 820 shows hovering over the other paste options section of the region menu. As can be seen, the other sections of the menu are displayed translucently while the Other Paste Options section is displayed such that the user may view the other options within the other paste options section. Alternatively, the other options could be displayed at a different translucency level. According to one embodiment, the Paste Gallery is populated with controls that include a paste menu, a Paste Recovery menu section (i.e. "Paste With Source/Destination Formatting," "Paste Text Only," etc.), and a "Paste Special" dialog (i.e. "Paste Link," "Paste Picture," etc.). In order to maintain a usable set of menu items, however, even though there are dozens of controls that can show up in the Paste Gallery, only a subset is available to the user at any given time. In other words, the Paste Gallery is designed to be contextual. As such, the visibility of menu items displayed within the paste gallery controls depends on the source (i.e. copy)/destination (i.e. paste) pair, or in some cases, only on the source. For example, it would not make sense to include "Paste Formatting Only" option if the source of the copy is a picture, nor does it make sense to include "Paste as New Rows" if the source is a shape.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for presenting a region menu, comprising:
   determining when to activate the region menu that includes at least two regions including a first region that is associated with a first menu, and a second region that is associated with a second menu, that are approximately adjacent to each other;
   selecting, based on a current context, the first menu as a default menu when the current context is a first context and selecting the second menu as the default menu when the current context is a second context, wherein the default menu is initially displayed, proximate to the region associated with the selected menu in response to activating the region menu and before displaying the other one of the first and second menus that is not selected;
   displaying the region menu;
   determining a menu to display that is selected from the first menu and the second menu; and
   displaying the menu.

2. The method of claim 1, wherein determining a menu to display comprises determining when an input device is located over one of the regions and displaying the corresponding menu that is associated with a section when the input device is located over the region.

3. The method of claim 2, wherein the menus that are each associated with a section of the region menu are consistent across applications.

4. The method of claim 1, wherein the region menu is a context menu.

5. The method of claim 1, wherein a portion of the displayed menu is displayed translucently in response to a menu option within the displayed menu is hovered over such that content under the displayed menu may be seen through the displayed menu.

6. The method of claim 5, wherein the portion of the menu that is displayed translucently includes sections of the menu that are outside of the section that includes the hovered-over menu item.

7. The method of claim 1, further comprising providing a live preview of a hovered-over menu option.

8. The method of claim 7, further comprising changing the live preview when the hovered-over menu option is selected.

9. A computer-readable storage medium storing computer-executable instructions for presenting a region menu, comprising:
   determining when to activate the region menu that includes at least two regions including a first region that is associated with a first menu, and a second region that is associated with a second menu, that are approximately adjacent to each other;
   selecting, based on a current context, the first menu as a default menu when the current context is a first context and selecting the second menu as the default menu when the current context is a second context, wherein the default menu is initially displayed, proximate to the region associated with the selected menu in response to activating the region menu and before displaying the other one of the first and second menus that is not selected;
   displaying the region menu;
   determining a menu to display that is selected from the first menu and the second menu; and
   displaying the menu.

10. The computer-readable storage medium of claim 9, wherein a portion of the menu displayed for the region is displayed translucently when a section within the menu is hovered over.

11. The computer-readable storage medium of claim 10, wherein the portion of the menu that is displayed translucently includes menu options that are included in other sections of the menu.

12. The computer-readable storage medium of claim 11, wherein the region menu comprises one of: three regions or four regions.

13. The computer-readable storage medium of claim 10, wherein the region menu is a context menu and wherein displaying the region menu comprises locating each of the regions of the region menu around a current location relating to a user input device.

14. The computer-readable medium of claim 10, wherein each of the menus that are each associated with a region of the region menu are consistent across applications; wherein one of the menus includes cut, copy and paste tools.

15. The computer-readable storage medium of claim 9, further comprising determining when a menu option within a menu is hovered over and providing a live preview of the hovered-over menu option.

16. The computer-readable storage medium of claim 15, further comprising changing the live preview when the hovered-over menu option is selected.

17. A system for utilizing a region menu, comprising:
a processor and a computer-readable medium;
an operating environment stored on the computer-readable medium and executing on the processor; and
a menu manager operating under the control of the operating environment and operative to:
  determine when to activate the region menu that includes at least two regions including a first region that is associated with a first menu, and a second region that is associated with a second menu, that are approximately adjacent to each other;
  select, based on a current context, the first menu as a default menu when the current context is a first context and select the second menu as the default menu when the current context is a second context, wherein the default menu is initially displayed, proximate to the region associated with the selected menu in response to activating the region menu and before displaying the other one of the first and second menus that is not selected;
  display the region menu;
  determine a menu to display that is selected from the first menu and the second menu; and
  display the menu.

18. The system of claim 17, wherein a portion of the menu is displayed translucently when a section is hovered over within the displayed menu such that content is visible underneath the translucent portion of the menu; wherein the portion of the menu that is displayed translucently includes menu options that are included in other sections of the menu.

19. The system of claim 18, further comprising determining a menu option within the menu being hovered over and providing a live preview of the hovered-over menu option such that projected results of the hovered-over menu item are displayed before the hovered-over menu option is selected.

20. The system of claim 19, further comprising changing the live preview when the hovered-over menu option is selected.

* * * * *